US006832244B1

(12) United States Patent
Raghunandan (10) Patent No.: US 6,832,244 B1
(45) Date of Patent: Dec. 14, 2004

(54) GRAPHICAL E-MAIL CONTENT ANALYSER AND PRIORITIZER INCLUDING HIERARCHICAL EMAIL CLASSIFICATION SYSTEM IN AN EMAIL

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/666,229

(22) Filed: Sep. 21, 2000

(51) Int. Cl.[7] .............................................. G06F 15/16
(52) U.S. Cl. ...................................... 709/206; 709/207
(58) Field of Search ................................ 709/205–207; 725/47

(56) References Cited

U.S. PATENT DOCUMENTS

| | | | | |
|---|---|---|---|---|
| 5,761,644 A | * | 6/1998 | Ueda et al. ..................... 705/1 |
| 5,796,394 A | * | 8/1998 | Wicks et al. ................. 345/751 |
| 5,930,471 A | * | 7/1999 | Milewski et al. ........... 709/204 |
| 5,948,058 A | * | 9/1999 | Kudoh et al. ............... 709/206 |
| 6,211,795 B1 | * | 4/2001 | Izuta ......................... 340/7.52 |
| 6,278,996 B1 | * | 8/2001 | Richardson et al. ........... 707/6 |
| 6,343,311 B1 | * | 1/2002 | Nishida et al. ............. 709/203 |
| 6,351,764 B1 | * | 2/2002 | Voticky et al. ............. 709/207 |
| 6,356,633 B1 | * | 3/2002 | Armstrong ............. 379/265.11 |
| 6,424,997 B1 | * | 7/2002 | Buskirk et al. ............. 709/206 |
| 6,442,592 B1 | * | 8/2002 | Alumbaugh et al. ........ 709/206 |

(List continued on next page.)

FOREIGN PATENT DOCUMENTS

| | | | | | |
|---|---|---|---|---|---|
| EP | 0371605 A2 | * | 6/1990 | .......... H04L/12/54 |
| EP | 0926612 A2 | * | 6/1999 | .......... G06F/17/60 |
| JP | 2002073478 A | * | 3/2002 | .......... G06F/13/00 |
| JP | 2002091871 A | * | 3/2002 | .......... G06F/13/00 |

*Primary Examiner*—Bunjob Jaroenchonwanit
(74) *Attorney, Agent, or Firm*—Anthony V. S. England; T. Rao Coca; Manny Schecter

(57) ABSTRACT

This invention relates to graphical email content analyser and prioritizer in an email system comprising a means for the user to define search parameters and possible values for each parameter with corresponding graphical images, for identifying and/or prioritizing received email messages, a means for parsing the contents of the email header and body contents and displaying the parameter values of the said messages in graphical form using the said graphical images, a means for grouping, and prioritising the said graphical message displays in accordance with user-defined requirements, and a means for accessing any message selected from the said graphical display.

The invention further includes a hierarchical e-mail classification system in a an email system comprising a means for the user to define parameters for classifying received email messages, a means for classifying each email after parsing the email contents or header to obtain values of classification parameters, a means for arranging and displaying said classified email messages in a hierarchical structure, a means for descending or ascending to a particular level in the structured hierarchy, a means for accessing a message at the lower level of the hierarchy from said display.

The invention also includes a method and computer program product in respect of the above systems.

23 Claims, 7 Drawing Sheets

U.S. PATENT DOCUMENTS

| | | | |
|---|---|---|---|
| 6,463,462 B1 * | 10/2002 | Smith et al. | 709/206 |
| 6,507,866 B1 * | 1/2003 | Barchi | 709/207 |
| 6,522,727 B1 * | 2/2003 | Jones | 379/88.23 |
| 6,529,942 B1 * | 3/2003 | Gilbert | 709/206 |
| 6,535,910 B1 * | 3/2003 | Suzuki et al. | 709/207 |
| 6,542,923 B2 * | 4/2003 | Nguyen | 709/206 |
| 6,597,378 B1 * | 7/2003 | Shiraishi et al. | 345/764 |
| 6,609,138 B1 * | 8/2003 | Merriam | 707/204 |
| 6,654,779 B1 * | 11/2003 | Tsuei | 718/101 |
| 2001/0029455 A1 * | 10/2001 | Chin et al. | 704/277 |
| 2001/0056366 A1 * | 12/2001 | Naismith | 705/10 |
| 2002/0013744 A1 * | 1/2002 | Tsunenari et al. | 705/28 |
| 2002/0032037 A1 * | 3/2002 | Segawa | 455/517 |
| 2002/0091777 A1 * | 7/2002 | Schwartz | 709/206 |
| 2002/0111994 A1 * | 8/2002 | Raghunandan | 709/203 |
| 2002/0129275 A1 * | 9/2002 | Decuir | 713/201 |
| 2002/0198950 A1 * | 12/2002 | Leeds | 709/206 |
| 2003/0023721 A1 * | 1/2003 | Vinberg | 709/224 |

* cited by examiner

Figure 6d

GRAPHICAL E-MAIL CONTENT ANALYSER AND PRIORITIZER INCLUDING HIERARCHICAL EMAIL CLASSIFICATION SYSTEM IN AN EMAIL

FIELD OF THE INVENTION

This invention relates to graphical email content analyser and prioritiser including hierarchical email classification system in an email.

BACKGROUND OF THE INVENTION

With an increase in e-mail usage there is a need to add powerful features to e-mail tools. E-mail usage is likely to increase at a phenomenal rate. This includes personal and official mail. With increasing mail volumes, users shall feel the need to use more powerful e-mail tools. Some of the problems that are likely to be faced by users in the near future are related to reading and replying to an enormous amount of mail.

The impact of this could be so far reaching especially in very influential and top positions (technical or management) that in a professional environment it could also lead to huge financial losses.

With a splurge in dot.com companies, and a present 160 million global users, e-mail usage is likely to assume gargantuan proportions and it is likely that in the future companies would appoint e-mail screeners to screen and prioritize mail. It is estimated that 500 million users would be hooked to the net by 2003. Add to this the growing intranet and extranet usage which is also likely to increase with e-business. Presently, the members of senior management in large organisations who handle high volume e-mail already have their secretaries to help them handle mail.

In fact 90% of time spent by a manager in any industry is in communicating (including meetings, telephone calls, mail), in the coming years there is going to be major shift towards mail usage especially in non-IT industries where the emphasis of communication is going to shift strategically to electronic mail.

With burgeoning e-mail quantity, there is a need to have special focus on how to choose mails that need the earliest attention E-mail usage is likely to become monotonous, ubiquitous and last but not the least extremely time consuming due to large volume. Consequently a great deal of conscious effort needs to be put into identifying and responding to the most important e-mail messages from the user's perspective at the earliest, especially in a business scenario. This is because if the right importance is not given to the right e-mail messages at the right time, it could lead to undue delay and careless responses. Arbitrary e-mail Usage in e-business scenario could lead to catastrophic effects. On the other hand high quality e-mail content at the right time with richness and relevance is likely to have a very positive impact on any transaction e-business or otherwise.

E-mail being a human activity so far, is therefore riddled by human problems like fatigue, lack of concentration and lack of time. There is a dire need for e-mail tools, which can alleviate the problems described above.

While receiving e-mail from a host of recipients/senders there is a need to:

1. Identify as many e-mail messages as possible on the screen.
2. Prioritize them as much as possible based on subject, sender, keywords mainly from the user's perspective.
3. Be able to give maximum attention to the most important mails as early as possible.
4. Be able to view as many mails as possible distributed into frames on one single screenful. This is to save the time spent in selecting and scrolling.

Presently:

1. The user does not know which mail is urgent from his/her perspective.
2. The user can see only 25 to 30 mails considering the area of his/her console/desktop with sender and subject information.
3. He/she cannot know which mail to see first on the basis of number of mails that he/she sees first on the screen which are ordinarily ranked on the basis of date/time received and/or Urgent/normal classification which is marked by the sender.

While handling a large amount of e-mail, users typically are nonplussed as to how to classify them and deal with them. The problem is even more severe when the amount of mail received ranges from thousands to millions, which would be a reality in the increasing networked world.

THE OBJECTS AND SUMMARY OF THE INVENTION

The object of this invention is to provide a method that addresses the problem of prioritizing large amount of e-mail graphically from the user's perspective such that the user can respond to his/her most important mails within the right time period.

Further object of this invention is to provide a hierarchical email classification system to address the problem when large number of mails are received.

To achieve the said objectives this invention provides in a computing system consisting of a processor, associated memory, storage and input and output devices, and an email system characterised in that the said email system includes:

- a means for the user to define search parameters and possible values for each parameter with corresponding graphical images, for identifying and/or prioritising received email messages,
- a means for parsing the contents of the email header and body contents and displaying the parameter values of the said messages in graphical form using the said graphical images,
- a means for grouping, and prioritising the said graphical message displays in accordance with user-defined requirements, and
- a means for accessing any message selected from the said graphical display.

The said means for defining search parameters includes a parameter definition table containing parameter name, possible values and corresponding icon/symbol/letter/color.

The said parameters include sender, subject, and specific content keyword and/or phrase.

The said means for defining parameters values and corresponding graphical images includes buttons and icons in the graphical user interface that can be selected using a pointing device. The said buttons are arranged in 17 columns and 14 rows i.e. a total of 238 buttons.

The means for parsing the contents of the email header and body contents is a standard text parsing means.

The said means for grouping and prioritising the graphical display is a graphical sorting means.

The said means for accessing any message is the keyboard or pointing device.

The above system further comprises a means for increasing and reducing the size of the graphical display images depending on the volume of email so as to cover as many images as possible on the screen.

The above system further comprises a means for simultaneously displaying a screenful of significant number of e-mail contents, in separate scrollable frames, by mouse selection of e-mail button(s) or by search window means.

The above system further comprises a means for replying any e-mail in its frame while viewing one screenful of frames of e-mail contents of the chosen group(s).

According to another embodiment of the invention, the system further comprises a hierarchical email classification system consisting of a means for the user to define parameters for classifying received email messages, a means for classifying each email after parsing email content or header to obtain values of classification parameters, a means for arranging and displaying said classified email messages in a hierarchical structure, a means for descending or ascending to a particular level in the structured hierarchy, a means for accessing a message at the lower level of the hierarchy from said display.

The said parameters for classification include sender, user, subject, domain, Keyword, size of the message and date of email message.

The said means for parsing the contents of the email header and body contents is a standard text parsing means.

The said means for displaying and selecting the said email messages in a hierarchical structure is by means of buttons in the graphical user interface.

The said means for accessing any message is by using the keyboard or pointing device.

For sender, subject and domain classification parameters the hierarchy is defined by the letter sequence in the text value of the classification parameter.

For size classification parameter the hierarchical sequence is defined in terms of range and subranges of size values.

The date classification parameter, the hierarchical sequence is defined in terms of date ranges and subranges.

The present invention also provides a method for analysing and prioritising received email messages using graphical techniques comprising.

defining search parameters and possible values for each parameter with corresponding graphical images, for identifying and/or prioritising received email messages, parsing the contents of the email header and body contents and displaying the parameter values of the said messages in graphical form using the said graphical images, grouping, and prioritising the said graphical message displays in accordance with user-defined requirements, and accessing any message selected from the said graphical display.

The said search parameters and possible values are defined using a parameter definition table method containing parameter name, possible values and corresponding icon/symbol/letter/color.

The said parameters include sender, subject, and specific content keyword and/or phrase.

The said parameters values and corresponding graphical images include the use of buttons and icons in the graphical user interface that can be selected using a pointing device.

The said buttons are arranged in 17 columns and 14 rows i.e. a total of 238 buttons.

The parsing the contents of the email header and body contents is carried out by standard text parsing methods.

The grouping and prioritising the graphical display is carried out by graphical sorting methods.

The said accessing of any message is done by using the keyboard or pointing device.

The above method further comprises increasing and reducing the size of the graphical display images depending on the volume of email so as to cover as many images as possible on the screen.

The above method further comprises simultaneously displaying a screenful of significant number of e-mail contents, in separate scrollable frames, by mouse selection of e-mail button(s) or by search window means.

The above method further comprises replying any e-mail in its frame while viewing one screenful of frames of e-mail contents of the chosen group(s).

In another embodiment of the invention, the method further comprises a method for analysing and prioritising received email messages in a hierarchical structure consisting of defining parameters for classifying received email messages, classifying each email after parsing email content or header to obtain values of classification parameters, arranging and displaying said classified email messages in a hierarchical structure, descending or ascending to a particular level in the structured hierarchy, accessing a message at the lower level of the hierarchy from said display.

The said parameters for classification include sender, user, subject, domain, keyword, size of the message and date of email message.

The parsing the contents of the email header and body contents is a standard text parsing method.

The displaying and selecting the said email messages in a hierarchical structure is by means of buttons in the graphical user interface.

The accessing of any message is carried out by using the keyboard or pointing device.

For sender, subject and domain classification parameters the hierarchy is defined by the letter sequence in the text value of the classification parameter.

For size classification parameter the hierarchical sequence is defined in terms of range and subranges of size values.

The date classification parameter, the hierarchical sequence is defined in terms of date ranges and subranges.

The instant invention further provides a computer program product comprising computer readable program code stored on computer readable storage medium embodied therein for causing a computer to analyse and prioritise received email messages, characterised in that, it includes:

computer readable code means configured for enabling the user to define search parameters and possible values for each parameter with corresponding graphical images, for identifying and/or prioritising received email messages, computer readable code means configured for parsing the contents of the email header and body contents and displaying the parameter values of the said messages in graphical form using the said graphical images, computer readable code means configured for grouping, and prioritising the said graphical message displays in accordance with user-defined requirements, and computer readable code means configured for accessing any message selected from the said graphical display.

The said computer readable code means is configured for defining search parameters includes a parameter definition table containing parameter name, possible values and corresponding icon/symbol/letter/color.

The said parameters include sender, subject, and specific content keyword and/or phrase.

The said computer readable code means is configured for defining parameters values and corresponding graphical images includes buttons and icons in the graphical user interface that can be selected using a pointing device.

The said buttons are arranged in 17 columns and 14 rows i.e. a total of 238 buttons.

The computer readable code means is configured for parsing the contents of the email header and body contents is a standard text parsing means.

The said computer readable code means is configured for grouping and prioritising the graphical display is a graphical sorting means.

The said computer readable code means is configured for accessing any message is the keyboard or pointing device.

The above computer program product further comprises a computer readable code means configured for increasing and reducing the size of the graphical display images depending on the volume of email so as to cover as many images as possible on the screen The above computer program product further comprises a computer readable code means configured for simultaneously displaying a screenful of significant number of e-mail contents, in separate scrollable frames; by mouse selection of e-mail button(s) or by search window means.

The above computer program product further comprises a computer readable code means configured for replying to any e-mail in its frame while viewing one screenful of frames of e-mail contents of the chosen group(s).

In another embodiment of the invention, the computer program product further comprises computer readable program code stored on computer readable storage medium embodied therein for causing a computer to analyse and prioritise the received email messages in a hierarchical structure, said computer program code comprising:

computer readable program code means configured for defining parameters for classifying received email messages, computer readable program code means configured for classifying each email after parsing email contents or header to obtain values of classification parameters, computer readable program code means configured for arranging and displaying said classified email messages in a hierarchical structure, computer readable program code means configured for descending or ascending to a particular level in the structured hierarchy, computer readable program code means configured for accessing a message at the lower level of the hierarchy from said display.

The said parameters for classification include sender, user, subject, domain, keyword, size of the message and date of email message.

The said computer readable program code means is configured for parsing the contents of the email header and body contents is a standard text parsing means.

The said computer readable program code means is configured for displaying and selecting the said email messages in a hierarchical structure is by means of buttons in the graphical user interface.

The said computer readable program code means configured for accessing any message is the keyboard or pointing device.

The said computer readable program code means for sender, subject and domain classification parameters the hierarchy is defined by the letter sequence in the text value of the classification parameter.

The said computer readable program code means for size classification parameter, the hierarchical sequence is defined in terms of range and subranges of size values.

The said computer readable program code means for the date classification parameter, the hierarchical sequence is defined in terms of date ranges and subranges.

BRIEF DESCRIPTION OF THE DRAWINGS

The invention will now be described with reference to the accompanying drawings.

DETAILED DESCRIPTION OF THE INVENTION

Figure 1:
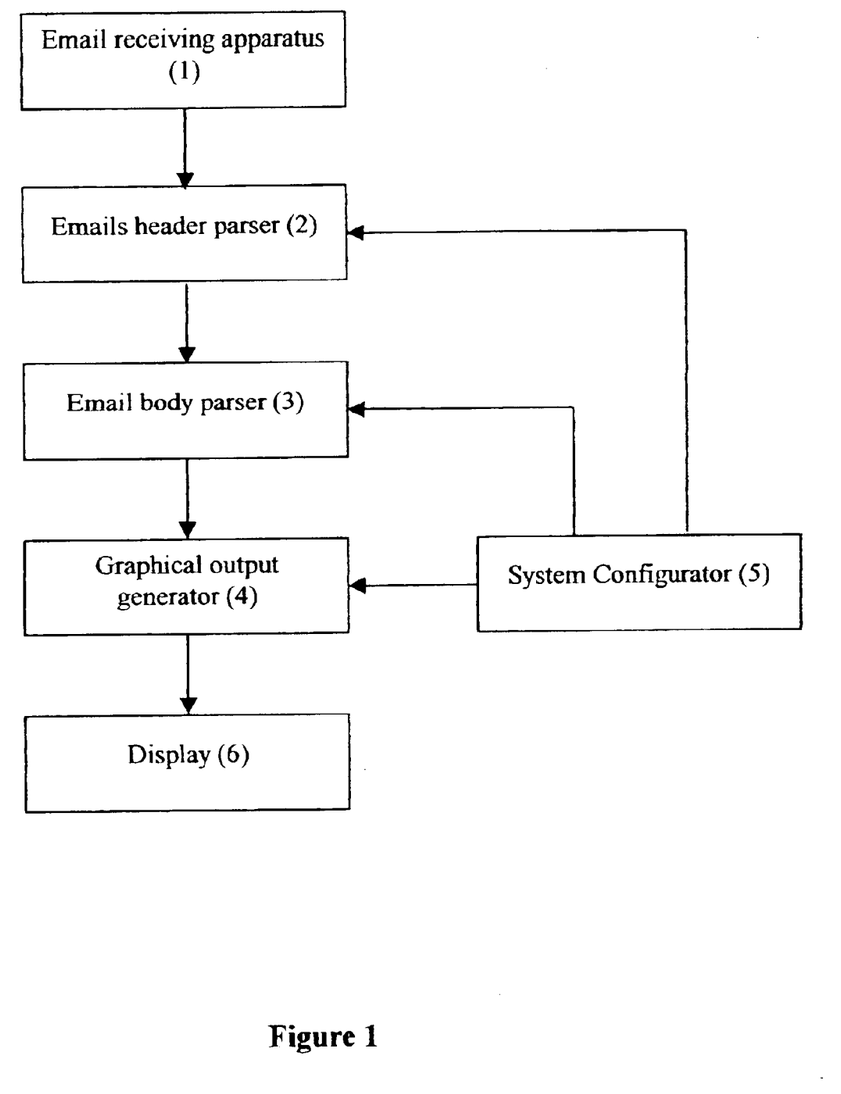
FIG. 1 shows the entity diagram of graphical e-mail content analyser and prioritiser, according to this invention

Referring to FIG. 1, the email receiving apparatus (1) receives the email. Email header parser (2) passes the header of the received email to extract information relating to subject sender, date, domain etc., as defined by the configuration data. The email body parser (3) further parses the email to extract information relating to keywords and/or phrases, as defined by the configuration information. Graphical output generator (4) receives the output form email header parser (2) and email body parser (3) and generates the graphical images in accordance with the configuration data provided by system configurator (5). This graphical data is then displayed in the output display device (6) for viewing by the user. The email header parser (2), email body parser (3) and graphical output generator (4) are all configured by the user using system configurator (5).

Figure 2:
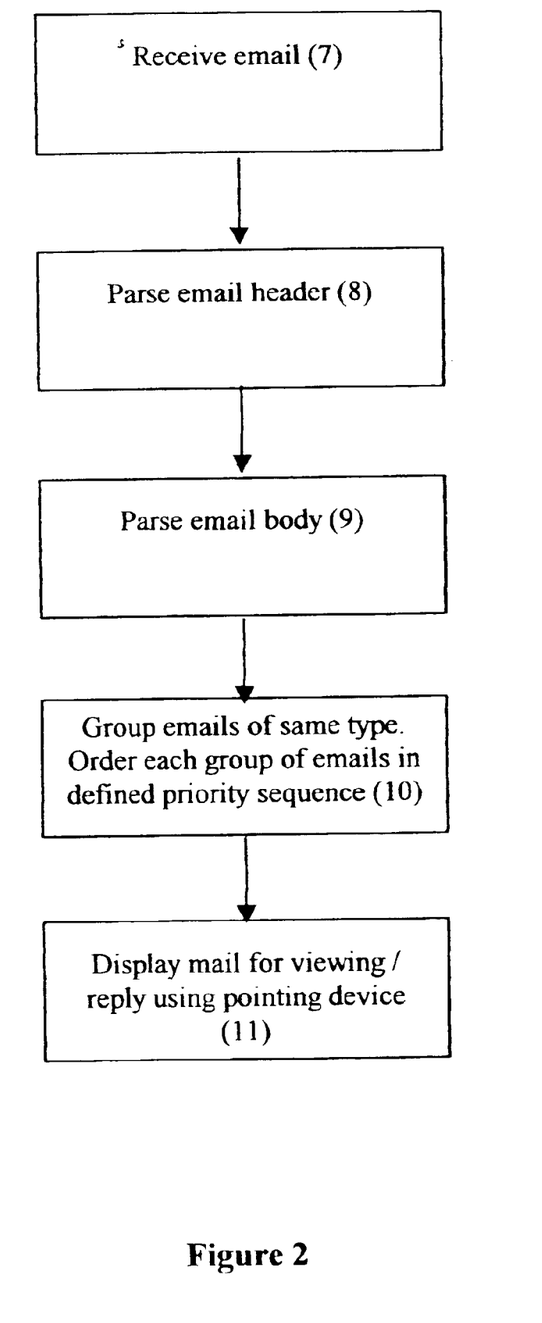
FIG. 2 shows the flow diagram of graphical e-mail content analyser and prioritiser, according to this invention

As shown in FIG. 2, each email is received (7) and parsed (8) by the email header parser (2) to extract information relating to sender, subject, date, domain etc., as configured. The email is then further parsed (9) by email body parser (3) to extract information relating to keywords and/or phrases contained in the body of the email. The parsed emails are identified based on combinations of various parameters such as keywords/phrases/sender/subject/domain, as defined in the configuration data. After identification, the emails of the same type are grouped together (10), as defined by the configuration information and the email groups are then sequenced in a priority sequence, defined by the configuration data. Finally, the emails are displayed (11) on the display device by graphical output generator (4), which converts each email into a graphical symbol, such as a button, in accordance with the configuration data supplied by the user. The user can select particular email (12) from the displayed graphical image by means for any pointing device. The selected email is then displayed on the screen in a scrollable frame. Multiple emails may also be selected and viewed in scrollable frames on one screen. The graphical symbols are selected based on a combination of colours, symbols and letters to provide a very complex and powerful capability for analysing and displaying the nature of email. The size of the graphical symbol can be reduced or increased, as desired, depending on the email volume so that as many symbols as possible can be viewed on the screen at the same time. The graphical display can be also used to show the emails in a order and prioritise sequence based on content indicative of urgency and importance from the user's perspective.

Figure 3:
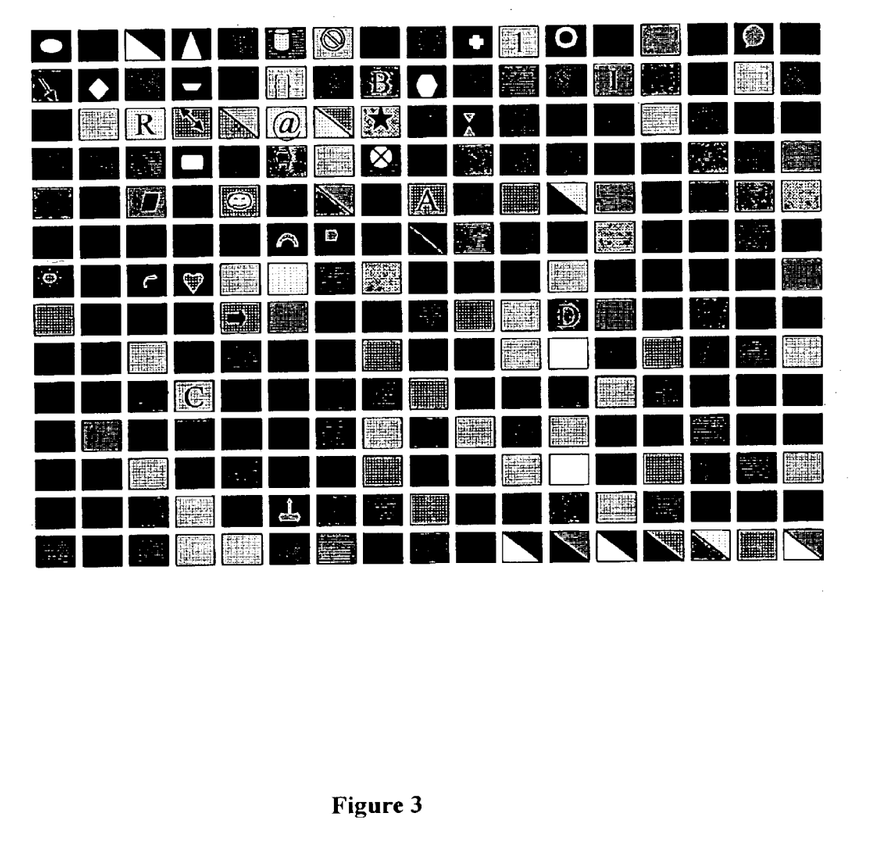
FIG. 3 shows a sample output of the invention.

FIG. 3 shows a sample graphical output of this invention. In this example, part of the configuration data is assumed to be the following

| Sample Parameters | Colour of button | Icon/Symbol/Letter |
|---|---|---|
| All Mails from John Smith | Red | Smiley |
| All Mails from John Smith with keyword "Rate" | Green | % (Percent symbol) |
| All Mails from John Smith with keyword "Work" | Pink | |
| All Mails from John Smith with Keywords "Party" and "Work" | Red and Pink triangles | |
| All Mails with sender domain Hotmail.com | White | |
| All Mails with sender domain .ibm.com | Blue | |
| All Mails with sender domain .ibm.com and subject: Patent | Dark Blue | Quote |
| All Mails with subject starting with A | Pink | A |

And so on. The above table is only illustrative and the specification is not limited to what has been shown above.

As shown, it is very easy to identify email content by looking at the symbol in the graphical display:

all mails with keyword 'immediate'—star on button all mails with keyword "payment"—Dollar on button all mails with subject "Rate"=% sign on button all mails with domain "hotmail.com"—Green button all mails from list if addresses in personal alias—Button with♡ all mails with domain "ibm.com"—Blue button

Figure 4:
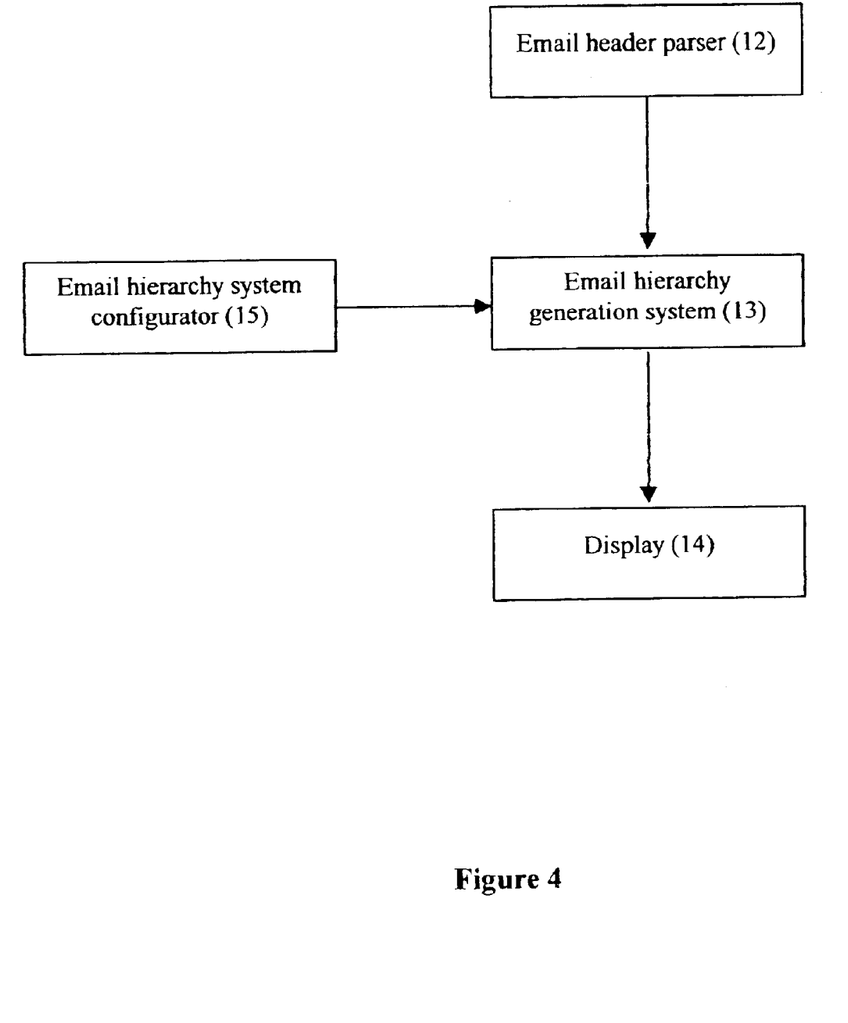
FIG. 4 shows the entity diagram for hierarchical email classification system, according to this invention.

Referring to FIG. 4, email header parser (12) parses the received email and identifies subject, user, sender, domain name, keyword, date and size. Email hierarchy generation system (13) uses the parsed output to classify the received email message in the hierarchical system, as configured by the configuration data. Email hierarchy system configurator (15) enables the user to specify the configuration parameters for the email header parser and hierarchy generation system (13). When required, the email hierarchy generation system (13) displays the email counts in the system hierarchy to the user on a display device (14).

Figure 5:
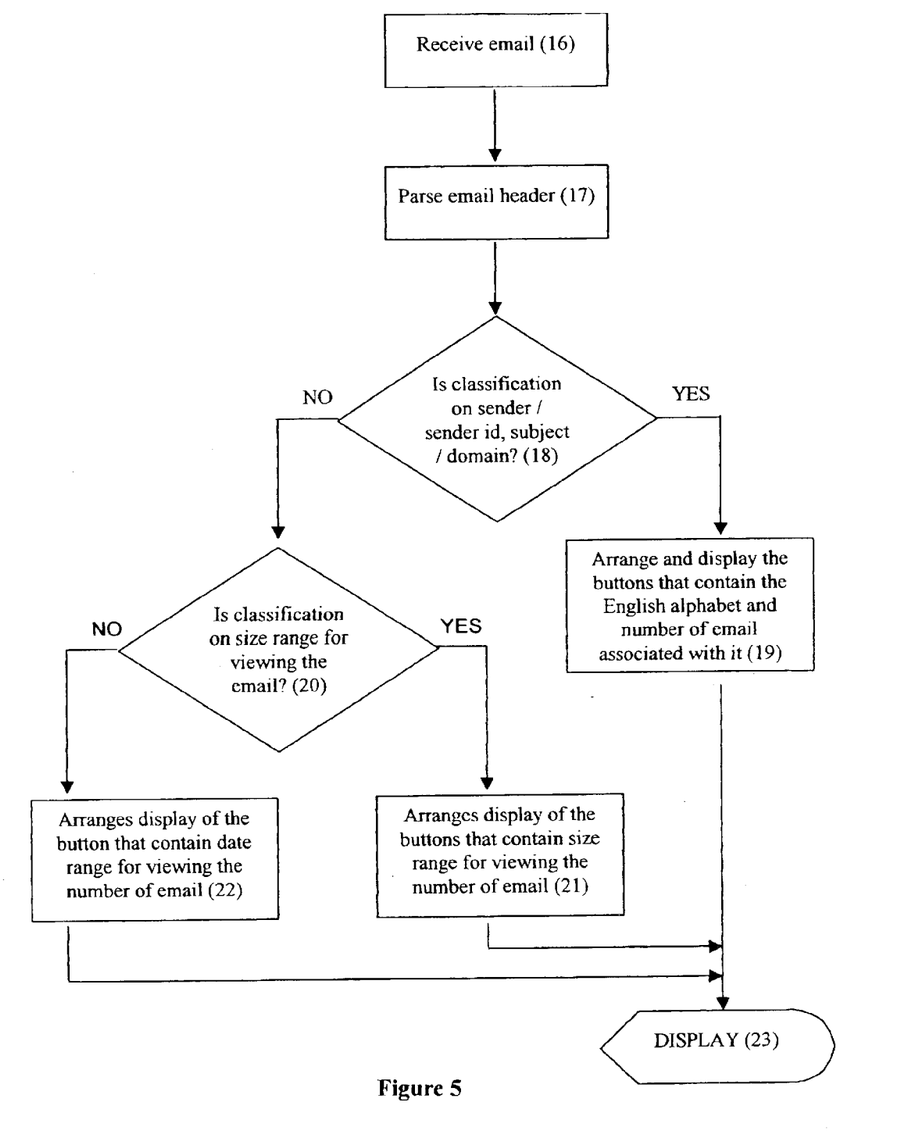
FIG. 5 shows the flow diagram for hierarchical email classification system, according to this invention

Referring to FIG. 5, the email is received (16) and parsed (17) by the email header parser (12) to extract subject, sender, domain, date and size information. The email hierarchy generation system (13) checks the configuration data to see whether it is required to classify sender/sender id or subject or domain (18). If so, it classifies the email in an alphabetically arranged hierarchy, incrementing the email count at the appropriate levels of the hierarchy. For instance, of the email is to be classified according to sender then an email with a sender name of "Adam" would be classified under "A" at the first level, "Ad" at the second level, "Ada" at the third level and "Adam" at the fourth level of the hierarchy classification. Similarly, if the classification is configured for size (20), then the system classifies the email based on the size of the message (21). Finally, if the classification is configured for date, the message is classified according to specified date ranges (22). The email classification generation system (13) maintains a count of the messages in each level of the hierarchy and displays (13) the counts to the user when required.

Figure 6A:
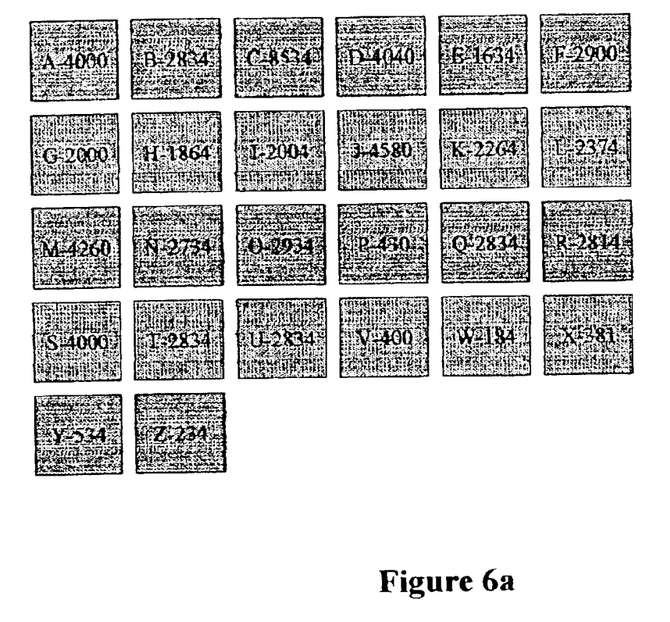
FIGS. 6a to 6d show representative displays of the various hierarchical levels, as the output of this invention.
Figure 6B:
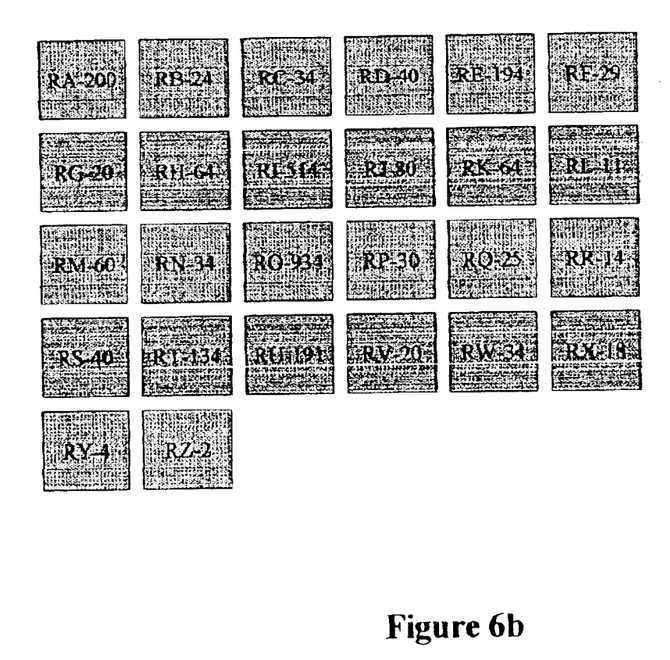
Figure 6C:
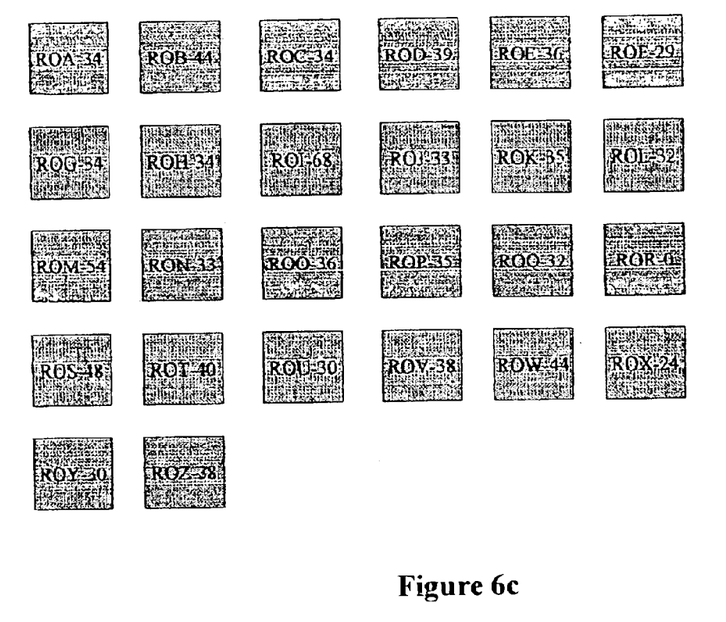
Figure 6D:
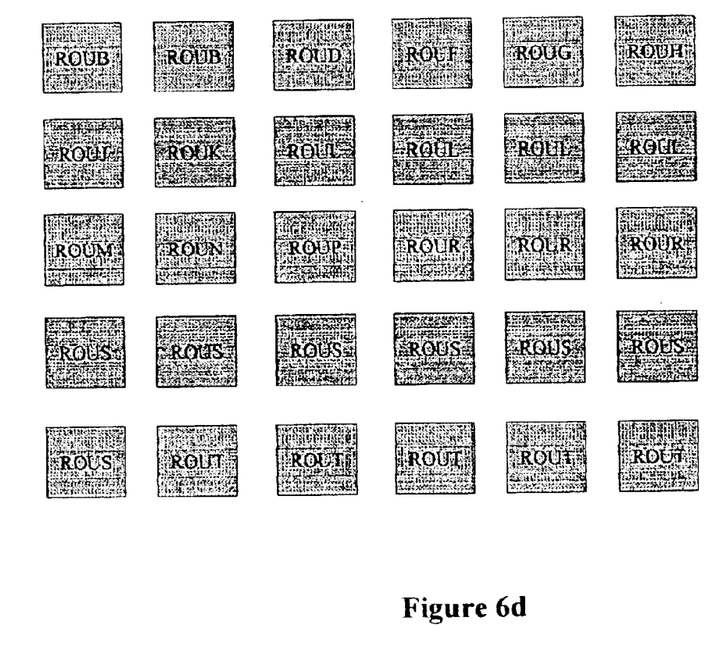

The displayed image is in the form of buttons, as shown in FIGS. 6a to 6d. FIG. 6a shows the top level of the hierarchy. FIGS. 6b to 6d show each subsequent lower level of the hierarchy. The user can click on any button to bring up a display of the lower level in the hierarchy. If a button represents the lower level of the hierarchy, then clicking it will bring up the email message associated with it on the screen. The lowest level of the hierarchy is identified by a count of '1' for the message count. The number, arrangement and size of the buttons can be configured by the user using the email hierarchical system configurator (15).

As an example, for the case of classification by sender upon having received a large number of e-mails from a plurality of senders, the invention would display the screen containing 26 buttons for the English alphabet as shown in the. FIG. 6a.

As can be seen from FIG. 6a, the 26 buttons describe the English alphabet. Each letter has a number associated with it. This number indicates the number of mails received from a sender whose name starts with the particular English alphabet. For e.g A-4000 means that there is a total of 4000 mails from senders whose name begins with an 'A'. Similarly, there is a total of 2834 mails from senders with names starting with 'B', 'Q', 'T' and 'U'.

Upon clicking each button further the appropriate mail branch is further expanded and more information available. For e.g. upon clicking the button contain R-2814 on could typically get.

As can be seen from FIG. 6b, there are 200 mails from senders with names/ids beginning with RA, there are 934 mails from senders with names/ids beginning with RO, etc.

Similarly, upon clicking on say, RO we would see FIG. 6c.

As can be seen in this figure there are 34 mails from senders with names/id starting from ROA etc.

The number of levels of hierarchy would be intelligently decided by the system depending on the volume of mails received.

Upon further clicking on a button say ROU, we get FIG. 6d.

Now each of the above buttons is a mail in itself The letters on the button show the starting alphabets of the names/id.

Upon further clicking the same one gets to view the mail

OTHER TYPES OF CLASSIFICATION

The method of classification can be any of the following, not excluding a combination of parameters.

Senders names or ids.

Domain of the sender.

Subject of the e-mail.

Specific keywords contained in the e-mail.

Size of the e-mail.

Attachments in the e-mails.

Date sent/received.

Present e-mail tools provide only linear sorting alphabetically in ascending/descending order.

They do not provide a hierarchical classification, as a result if there are thousands or millions of mails one may have to browse or scroll or the screen for a long time in order to reach particular mails. The search by sender name facility is also limited in use and application, and will not be of much use when one needs to find out number of mails sent by users with a particular classification parameter (sender name, domain, subject etc.)

The benefit from this method is that e-mail can be easily classified and accessed hierarchically. The user is encouraged to view only one screenful of data and thus does not need to scroll the screen up and down.

The invention can be configured to set up complex classification schemes based on the recipient profile.

The classification can be a combination of various parameters like sender, subject, keywords and date etc.

The invention would be equipped with parsers to parse the e-mail header and body to gather information on the sender, domain and specific keywords if any.

The invention would be equipped to read contents from all types of mailboxes.

This method of classification would be invaluable in a e-business scenario where large volume e-mail is expected.

What is claimed is:

1. In a computing system having a processor, storage and input and output devices, a email system comprising:
   email receiving means for receiving emails;
   a configurator for providing configuration data;
   an email header parser for parmine a header of such a received email to extract a subject sender, date, and domain responsive to the configuration data;
   an email body parser for parsing a body of such a received email to extract at least one keyword responsive to the configuration data; and
   a graphical output generator for generating a number of buttons representing respective ones of the emails, the buttons being arranged by the graphical output generator in arrays of rows and columns for displaying, such a button having graphical elements including least a colour pattern and symbol for identifying selected ones of the extracted keyword, sender, subject, date, and domain of the button's respective email, wherein the colours patterns and symbols and the ones of the extracted keyword, sender, subject, date and domain selected are responsive to the configuration data.

2. A system as claimed in claim 1, including:
   a display device for displaying one of the arrays so that the buttons of the array that can be selected using a pointing device.

3. A system as claimed in claim 1, wherein said buttons are of a size such that at least 238 of the buttons are concurrently displayable.

4. A system as claimed in claim 1, wherein the graphical output generator reduces sizes of the buttons responsive to a volume of the received emails so that the number of buttons concurrently displayable increases as the volume of the received emails increases.

5. A system as claimed in claim 1 further comprising:
   a hierarchy generator for classifying the emails, responsive to a parameter selection, into a hierarchical arrangement having a number of levels, the parameters including keyword, sender, subject, date, size and domain, and the parameter selection being in response to the configuration data wherein the arrays correspond to respective ones of the levels in the hierarchy.

6. A system as claimed in claim 5, wherein for the sender, subject and domain parameters the levels of the hierarchical arrangement correspond to letter sequences in text values.

7. A system as claimed in claim 5, wherein for the size parameter the levels of the arrangement correspond to ranges and subranges of size values.

8. A system as claimed in claim 5, wherein for the date parameter the levels of the hierarchical arrangement correspond to date ranges and subranges.

9. In a computing system, a method for
   a) receiving emails;
   b) providing configuration data;
   c) parsing a header of such a received email to extract a subject, sender, date, and domain responsive to the configuration data:
   d) parsing a body of such a received email to extract at least one keyword responsive to the configuration data; and
   e) generating a number of buttons representing respective ones of the emails, the buttons being arranged in arrays of rows and columns for displaying, such a button having graphical elements including at least a colour, pattern and symbol for identifying selected ones of the extracted keyword, sender, subject, date and domain of the button's respective email, wherein the colours, patterns and symbols and the ones of the extracted keyword, sender, subject date and domain selected are responsive to the configuration data.

10. A method as claimed in claim 9 comprising the step of:
    displaying one of the arrays so that the buttons of the array can be selected using a pointing device.

11. A method as claimed in claim 9 wherein said buttons are of such a size that at least 238 of the buttons are concurrently displayable.

12. A method as claimed in claim 9 wherein step e) further comprises the step of:
    reducing sizes of the buttons responsive to a volume of the received emails so that the number of buttons concurrently displayable increases as the volume of the received emails increases.

13. A method as claimed in claim 9, further comprising the step of:
    classifying the emails, responsive to a parameter selection, into a hierarchical arrangement having a number of levels, the parameters including keyword, sender, subject, date, size and domain, and the parameter selection being in response to the configuration data, wherein the arrays correspond to respective ones the levels in the hierarchy.

14. A method as claimed in claim 13, wherein for the sender, subject and domain parameters the levels of the hierarchical arrangement correspond to letter sequences in text values.

15. A method as claimed in claim 13, wherein for the size parameter the levels of the hierarchical arrangement correspond to ranges and subranges of size values.

16. A method as claimed in claim 13, wherein for the date parameter, the levels of the hierarchical arrangement correspond to date ranges and subranges.

17. A computer program product comprising computer readable program code stored on computer readable storage medium embodied therein for providing information about email, the computer readable program code comprising:
    email receiving code for receiving emails; configurator code for providing configuration data;
    email header parser code for parsing a header of such a received email to extract a subject, sender, date, and domain responsive to the configuration data;

email body parser code for parsing a body of such a received email to extract at least one keyword responsive to the configuration data; and graphical output generator code for generating a number of buttons representing respective ones of the emails, the buttons being arranged by the graphical output generator in arrays of rows and columns for displaying such a button having graphical elements including at least a colour, pattern and symbol for identifying selected ones of the extracted keyword, sender, subject, date and domain of the button's respective email, wherein the colours, patterns and symbols and the ones of the extracted keyword sender subject, date and domain selected are responsive to the configuration data.

18. A computer program product as claimed in claim 17, wherein said buttons are of a size such that least 238 buttons are concurrently displayable.

19. A computer program product as claimed in claim 17, wherein the graphical output generator code reduces sizes of the buttons responsive to a volume of the received emails so that the number of buttons concurrently displayble increases as the volume of the received emails increases.

20. A computer program product as claimed in claim 17, wherein the computer readable program code further comprises:

hierarchy generator code for classifying the emails, responsive to a parameter selection, into a hierarchical arrangement having a number of levels, the parameters including keyword, sender, subject, date, size and domain and the parameter selection being in response to the configuration data wherein the arrays correspond to respective ones of the levels in the hierarchy.

21. A computer program product as claimed in claim 20, wherein for the sender, subject and domain parameters the levels of the hierarchical arrangement correspond to letter sequences in text values.

22. A computer program product as claimed in claim 20, wherein for the size parameter, the levels of the hierarchical arrangement correspond to range and subranges of size values.

23. A computer program product as claimed in claim 20, wherein for the date parameter, the levels of the hierarchical arrangement correspond to date ranges and subranges.

* * * * *